United States Patent
Koizumi et al.

(10) Patent No.: US 10,741,201 B2
(45) Date of Patent: Aug. 11, 2020

(54) MAGNETIC RECORDING DEVICE CAPABLE OF STABILIZING OSCILLATIONS OF HIGH FREQUENCY ASSISTED ELEMENT

(71) Applicants: Kabushiki Kaisha Toshiba, Minato-Ku, Tokyo (JP); Toshiba Electronic Devices & Storage Corporation, Minato-Ku, Tokyo (JP)

(72) Inventors: Gaku Koizumi, Kawasaki Kanagawa (JP); Masaya Ohtake, Fujisawa Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/556,445

(22) Filed: Aug. 30, 2019

(65) Prior Publication Data

US 2020/0211585 A1 Jul. 2, 2020

(30) Foreign Application Priority Data

Dec. 28, 2018 (JP) .................. 2018-246700

(51) Int. Cl.
| | | |
|---|---|---|
| G11B 11/105 | (2006.01) | |
| G11B 5/09 | (2006.01) | |
| G11B 5/17 | (2006.01) | |
| G11B 5/35 | (2006.01) | |
| G11B 5/00 | (2006.01) | |

(52) U.S. Cl.
CPC .................. *G11B 5/09* (2013.01); *G11B 5/17* (2013.01); *G11B 5/35* (2013.01); *G11B 2005/0021* (2013.01); *G11B 2005/0024* (2013.01); *G11B 2005/0026* (2013.01); *G11B 2005/0029* (2013.01)

(58) Field of Classification Search
None
See application file for complete search history.

(56) References Cited

U.S. PATENT DOCUMENTS

| | | | |
|---|---|---|---|
| 8,917,465 B1 | 12/2014 | Contreras et al. | |
| 9,099,128 B1 | 8/2015 | Contreras et al. | |
| 9,666,216 B1 * | 5/2017 | Kobayashi | G11B 5/02 |
| 9,691,415 B2 * | 6/2017 | Koui | G11B 5/09 |
| 10,014,009 B1 * | 7/2018 | Koizumi | G11B 5/3906 |
| 10,504,543 B1 * | 12/2019 | Koizumi | G11B 5/1278 |
| 10,546,600 B1 * | 1/2020 | Koizumi | G11B 5/012 |
| 2012/0147498 A1 | 6/2012 | Amemiya | |

(Continued)

FOREIGN PATENT DOCUMENTS

| | | |
|---|---|---|
| JP | 2010-150351 A | 7/2010 |
| JP | 2012-014792 A | 1/2012 |
| JP | 2014-086122 A | 5/2014 |

*Primary Examiner* — Tan X Dinh
(74) *Attorney, Agent, or Firm* — White & Case LLP

(57) ABSTRACT

According to one embodiment, a magnetic disk device applies a bias voltage for measurement to a high frequency assist element according to a setting instruction of the bias voltage to measure a conduction current by in a recording head, calculates the resistance value in the supply path of the bias voltage from a relationship between the measured current and the bias voltage for measurement, and changes the bias voltage applied at the time of data recording based on the calculated resistance value.

16 Claims, 10 Drawing Sheets

(56) References Cited

U.S. PATENT DOCUMENTS

| | | | |
|---|---|---|---|
| 2013/0050865 A1* | 2/2013 | Katada | G11B 5/1278 |
| | | | 360/31 |
| 2014/0118861 A1 | 5/2014 | Funayama | |
| 2014/0168808 A1* | 6/2014 | Koizumi | G11B 5/40 |
| | | | 360/31 |
| 2014/0268404 A1* | 9/2014 | Horide | G11B 5/235 |
| | | | 360/75 |
| 2016/0225392 A1* | 8/2016 | Takeo | G11B 5/3166 |
| 2018/0350397 A1* | 12/2018 | Matsumoto | G11B 5/314 |
| 2019/0362744 A1* | 11/2019 | Contreras | G11B 5/02 |
| 2020/0075046 A1* | 3/2020 | Koizumi | G11B 5/1278 |

* cited by examiner

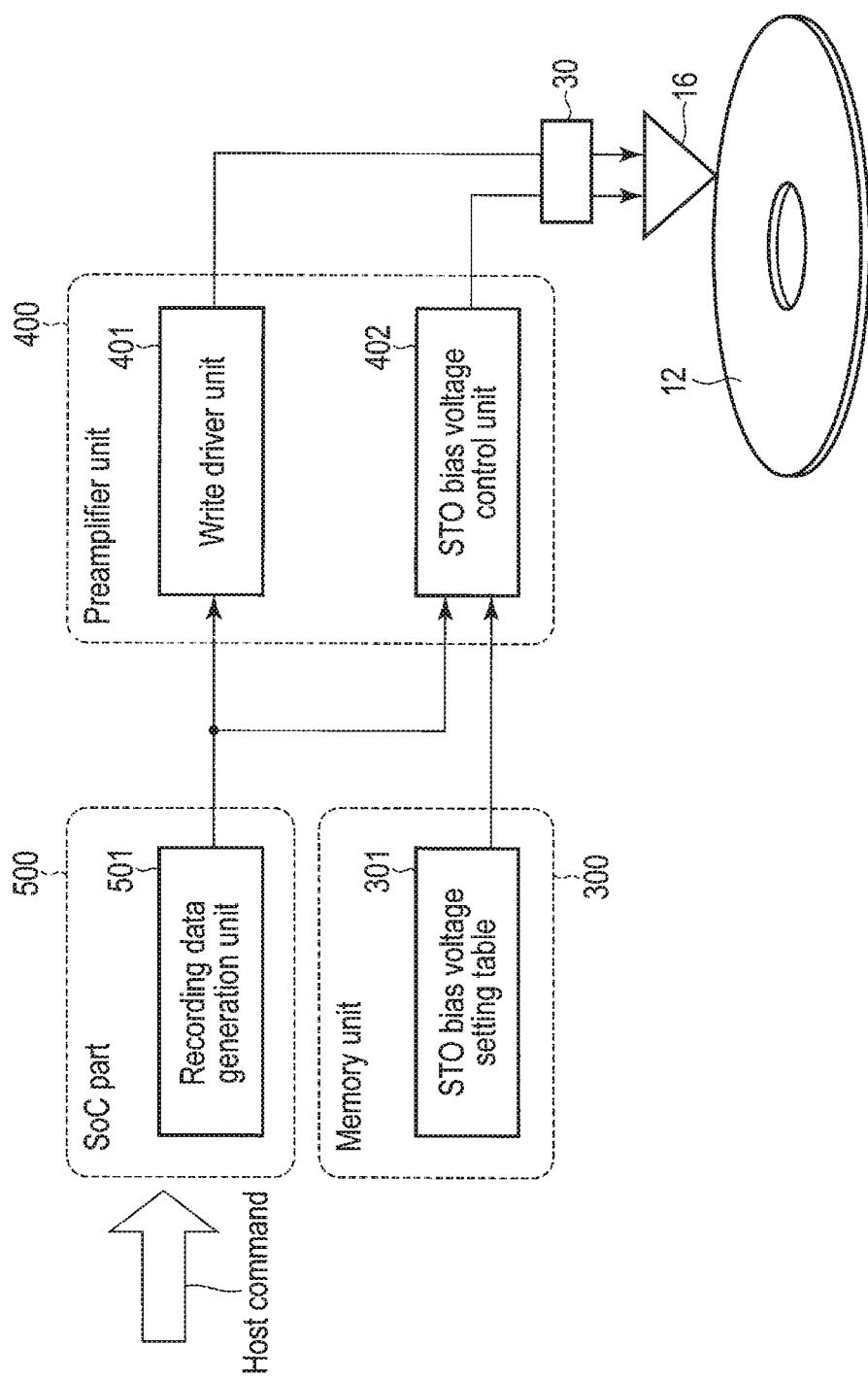
F I G. 5

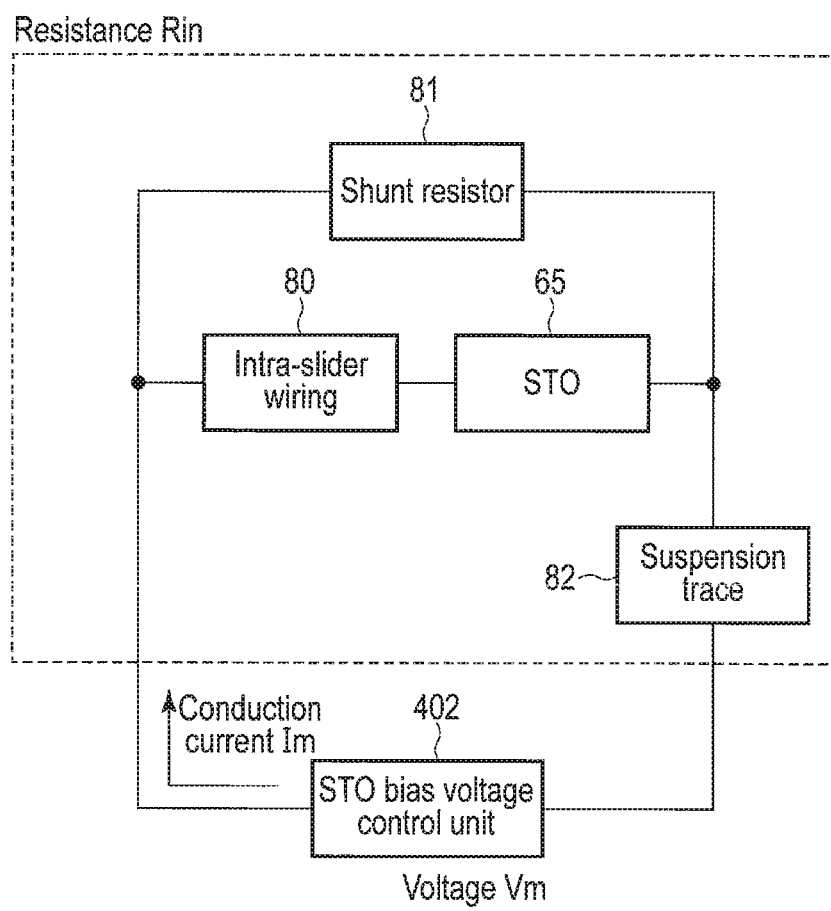
F I G. 6

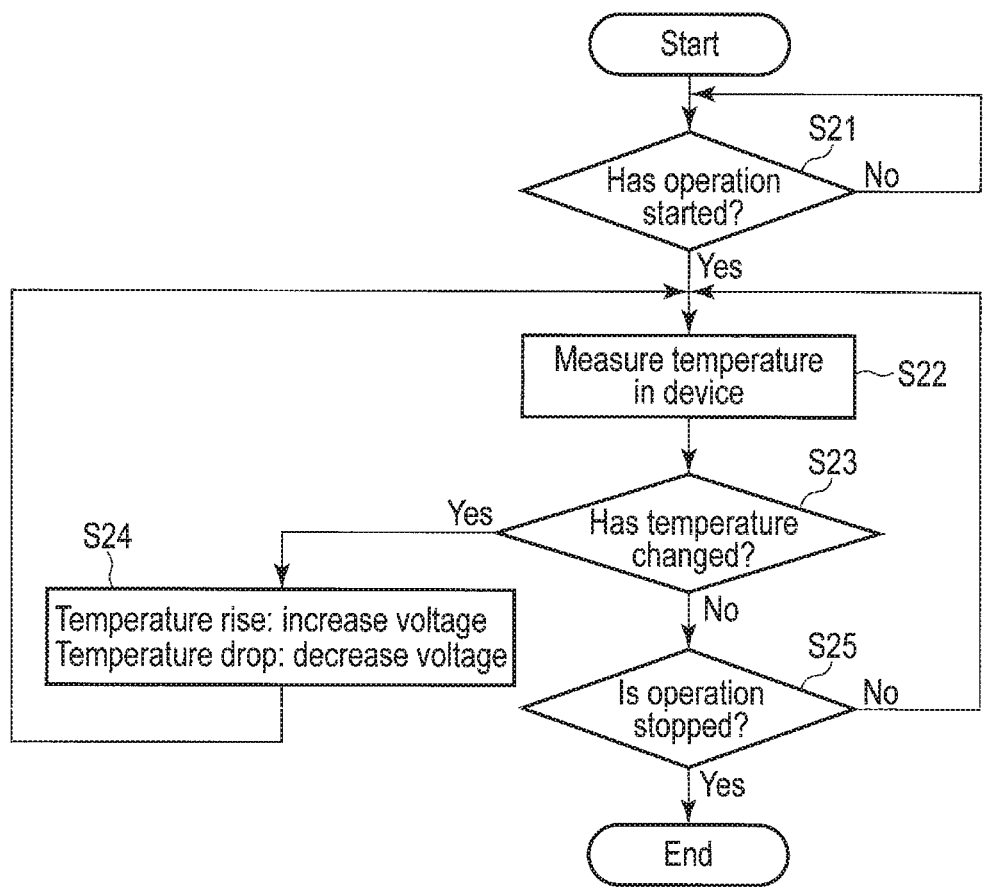
F I G. 9

MAGNETIC RECORDING DEVICE CAPABLE OF STABILIZING OSCILLATIONS OF HIGH FREQUENCY ASSISTED ELEMENT

CROSS-REFERENCE TO RELATED APPLICATIONS

This application is based upon and claims the benefit of priority from Japanese Patent Application No. 2018-246700, filed Dec. 28, 2018, the entire contents of which are incorporated herein by reference.

FIELD

Embodiments described herein relate generally to a magnetic disk device using a recording head for perpendicular magnetic recording, and a controlling method of the recording head used in the magnetic disk device.

BACKGROUND

In recent years, in a magnetic disk device, a perpendicular magnetic recording system has been adopted to achieve high recording density, large capacity, or miniaturization. In a magnetic disk device of this type, data is recorded by positioning a recording head for perpendicular magnetic recording so as to face a recording surface of a magnetic disk having a recording layer for perpendicular magnetic recording, and causing the recording head to generate a perpendicular magnetic field corresponding to recording data in a predetermined region of the magnetic disk.

The above-described recording head includes a main pole a narrowed portion made of a soft magnetic metal and configured to generate a magnetic field in the perpendicular direction; a return pole disposed opposite to the main pole with a write gap in between, and refluxing the magnetic flux from the main pole to form a magnetic circuit with the main pole; and a coil configured to excite a magnetic flux in the magnetic circuit formed by the main pole and the return pole to generate a recording magnetic field.

In the recording head having the above-described configuration, a high frequency assist element is disposed in the write gap in order to further improve a recording capability. The high frequency assist element generates magnetic resonance by generating specific a high frequency vibration at the time of recording and applying the high frequency vibration to a magnetic recording surface, thereby assisting a response of magnetization reversal. An example of the high frequency assist element includes a spin torque oscillating element (STO: Spin Torque Oscillator).

Incidentally, in order to stably oscillate the high frequency assist element, in the related art, a method of generating a constant bias voltage by a preamplifier in the drive circuit and applying the constant bias voltage to the element so that a constant current density is applied to the element.

However, the high frequency assist elements vary in dimensions due to the difficulty of manufacturing, and thus the elements themselves vary in resistance value correspondingly. If the resistance values of the elements themselves are subjected to variations, the voltage values applied to the element parts will largely vary, and as a result, not only the variations in oscillation characteristics but also the possibility of causing element damage due to excessive voltage application may occur.

Further, not only the resistance values of the high frequency assist elements themselves, but also the influence of the incidental resistance component inherent in the wiring path cannot be ignored. In other words, since the incidental resistance component fluctuates according to the temperature change, the voltage applied to the element portion also fluctuates, which hinders achievement of the constant current density.

The object of the embodiment of the present invention is provide a magnetic disk device capable of stabilizing oscillations by making a voltage applied to the element constant regardless of variations in dimension of the high frequency assist element and temperature characteristics of an incidental resistance component of a wiring path, thereby improving a recording density, and a recording head controlling method.

BRIEF DESCRIPTION OF THE DRAWINGS

FIG. 5 is a block diagram illustrating a system configured to control the STO bias voltage at the time of data recording in the first embodiment.

FIG. 6 is a block circuit diagram illustrating an equivalent circuit in the supply path of the STO bias voltage in the first embodiment.

FIG. 9 is a flow chart illustrating a flow of a process of controlling the STO bias voltage in consideration of incidental resistance which fluctuates according to an internal temperature of a device in a second embodiment.

DETAILED DESCRIPTION

Figure 1:
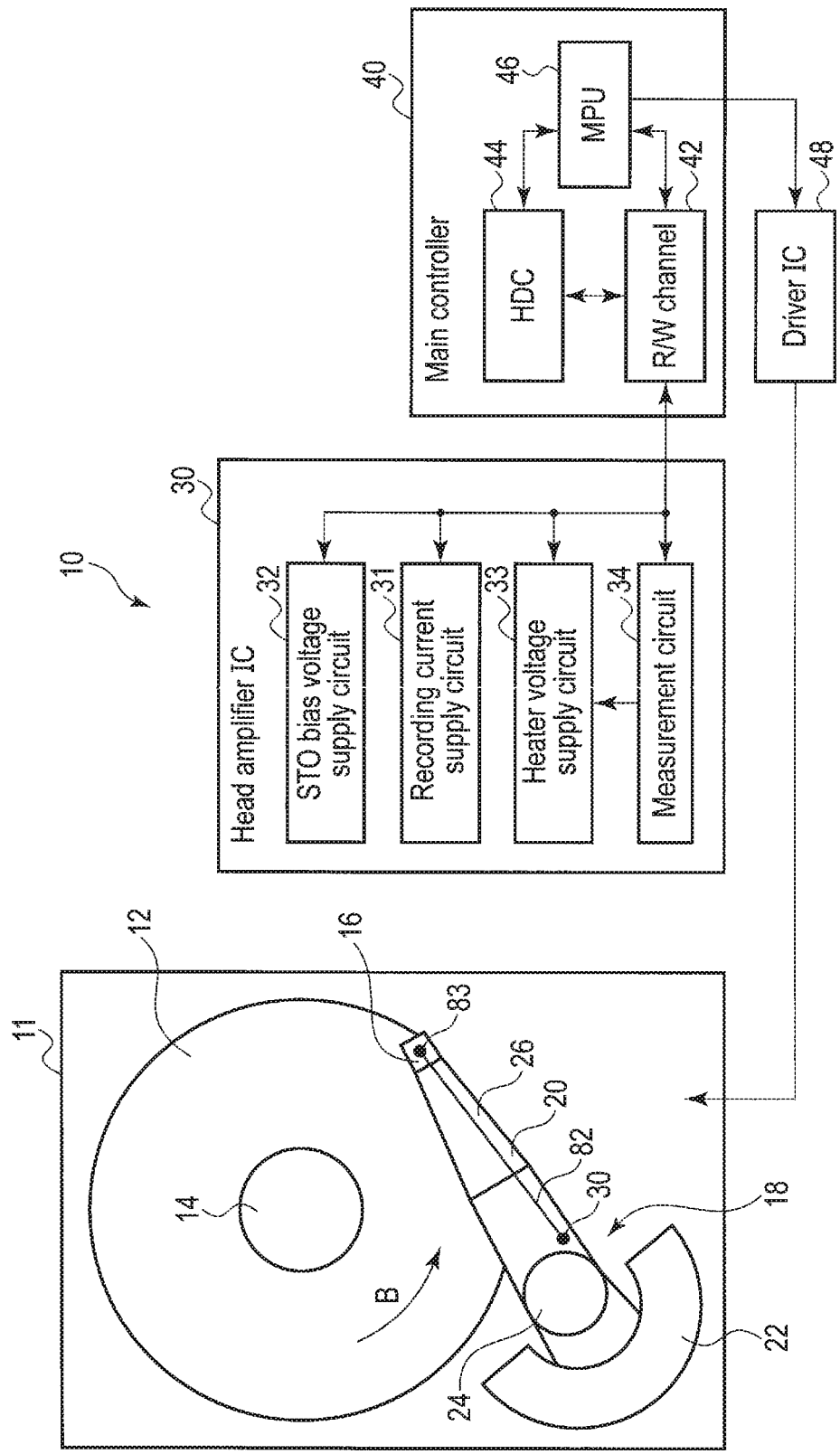
FIG. 1 is a block diagram schematically illustrating a magnetic disk device (HDD) according to a first embodiment.

Embodiments will be described hereinafter with reference to the accompanying drawings.

In general, according to one embodiment, a magnetic disk device includes a magnetic disk having a recording layer, a recording head configured to apply a perpendicular recording magnetic field to the recording layer; a controller configured to control the recording head; the recording head includes a main pole configured to generate the perpendicular recording magnetic field at a distal end portion; a return pole having a distal end portion facing the distal end portion of the main pole via a write gap; a coil configured to excite a magnetic flux in a magnetic circuit formed by the main pole and the return pole; a high frequency assist element that is disposed in the write gap, oscillates a high frequency wave by an application of the bias voltage, and assists magnetization of the magnetic disk using the high frequency wave; and a bias voltage supply source configured to supply a bias voltage to be applied to the high frequency assist element through the main pole and the return pole, the controller applies a bias voltage for measurement to the high frequency assist element according to a setting instruction of the bias voltage to measure a conduction current, calculates a resistance value in a supply path of the bias voltage from a relationship between the measured current and the bias voltage for measurement, and changes the bias voltage applied at the time of data recording based on the calculated resistance value.

In the following description, the disclosure is merely an example, and includes those which can be easily modified and which can be easily conceived by those skilled in the art while keeping the spirit of the invention is naturally included in the scope of the present invention. In addition, the drawings may be schematically represented as to the width, thickness, shape, and the like of each portion in comparison with the actual modes in order to clarify the description. However, this is merely an example, and is not intended to limit the interpretation of the present invention. In the specification and the drawings, the same elements as those described above with reference to the drawings already described may be denoted by the same reference numerals, and the detailed description may be appropriately omitted.

First Embodiment

Figure 2:
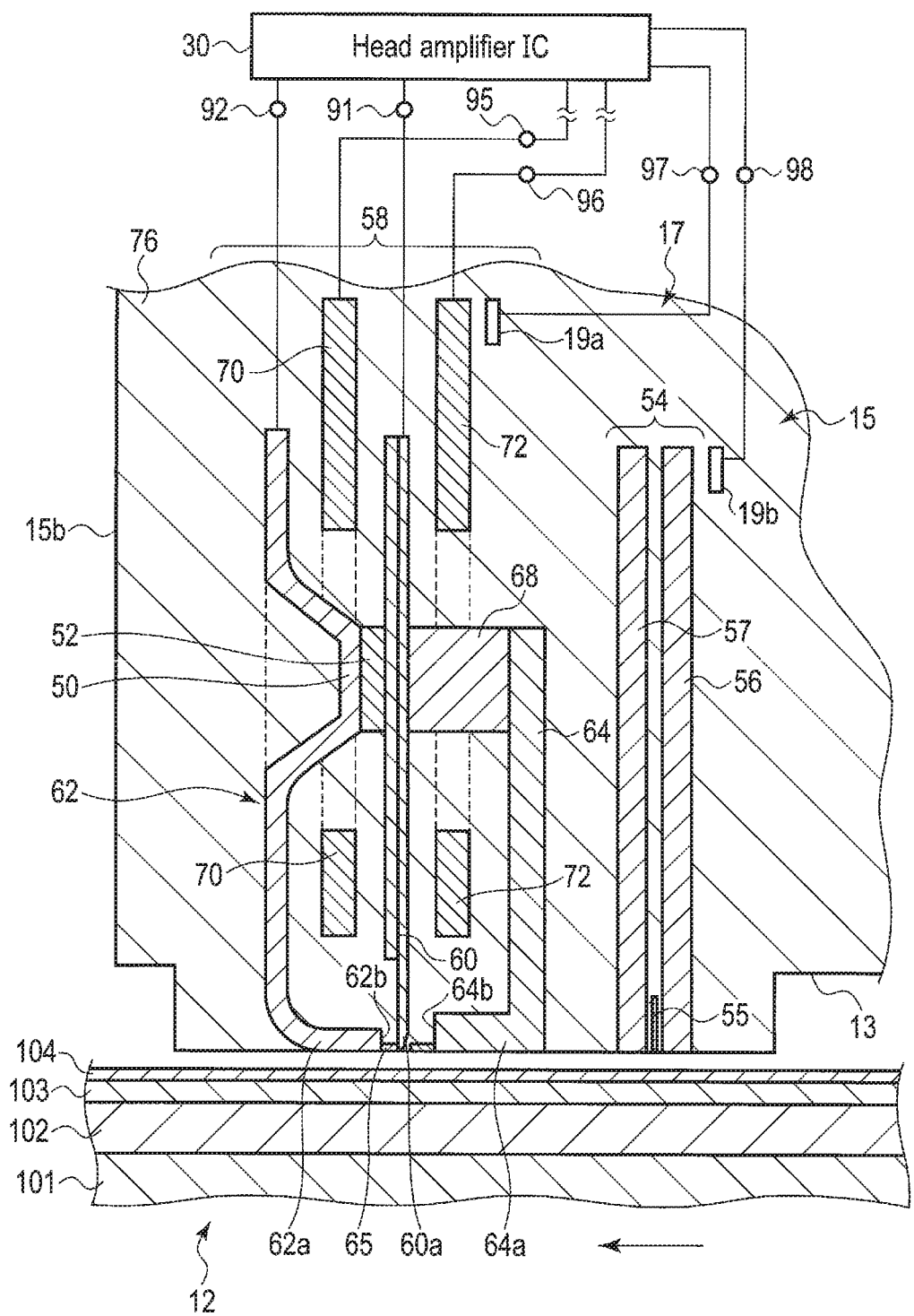
FIG. 2 is a cross-sectional view schematically illustrating a head unit of a magnetic head in an HDD and part of a magnetic disk in the first embodiment in an enlarged scale.
Figure 3:
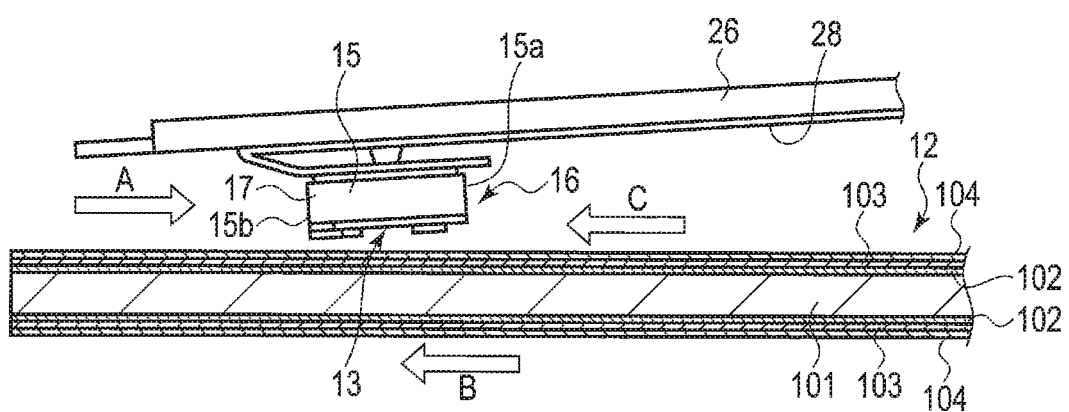
FIG. 3 is a side view illustrating the magnetic head, a suspension, and a recording medium in the HDD in the first embodiment.
Figure 4:
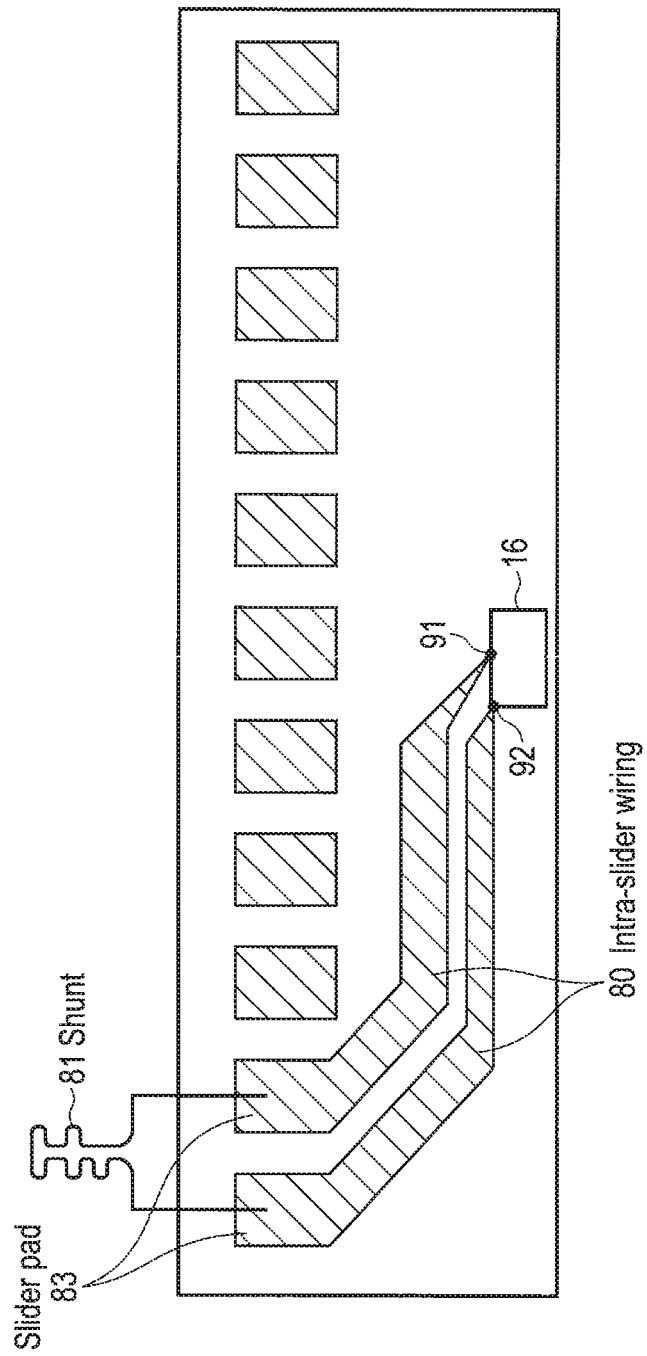
FIG. 4 is a view illustrating a schematic configuration of a head slider of the magnetic head viewed in a direction A in FIG. 3 in the first embodiment.

A configuration of a magnetic disk device (hard disk drive: hereinafter referred to as HDD) to which the embodiment is applied will be described with reference to FIGS. 1 and 2. FIG. 1 is a block diagram schematically illustrating an HDD, FIG. 2 is a cross-sectional view schematically illustrating a head unit of a magnetic head and part of a magnetic disk partly in an enlarged scale, FIG. 3 is a side view illustrating the magnetic head, a suspension, and a recording medium in the HDD, FIG. 4 is a view illustrating a schematic configuration of a head slider of the magnetic head is viewed in a direction A in FIG. 3, and FIG. 5 is a block diagram illustrating a system configured to control the STO bias voltage.

As illustrated in FIG. 1, the HDD 10 includes a housing 11 having a rectangular shape, a magnetic disk 12 as a recording medium disposed in the housing 11, a spindle motor 14 for supporting and rotating the magnetic disk 12, and a magnetic head 16 for writing and reading data to and from the magnetic disk 12. The HDD 10 also includes a head actuator 18 for moving and positioning the magnetic head 16 on any track on the magnetic disk 12. The head actuator 18 includes a suspension assembly 20 for movably supporting the magnetic head 16 and a voice coil motor (VCM) 22 for rotating the suspension assembly 20.

The HDD 10 includes a head amplifier (or preamplifier) IC 30, a main controller 40, and a driver IC 48. The head amplifier IC 30 is provided, for example, in the suspension assembly 20 and is electrically connected to the magnetic head 16. The main controller 40 and the driver IC 48 are configured, for example, on a control circuit board, which is not illustrated, provided on the back side of the housing 11. The main controller 40 includes an R/W channel 42, a hard disk controller (HDC) 44, and a microprocessor (MPU) 46. The main controller 40 is electrically connected to the head amplifier IC 30 and also electrically connected to a VCM 22 and the spindle motor 14 via the driver IC 48. The HDD 10 can be connected to a host computer, which is not illustrated.

The above-described magnetic disk 12 is a perpendicular magnetic recording medium having a recording layer having anisotropy in the direction perpendicular to a disk surface. Specifically, the magnetic disk 12 includes, for example, a substrate 101 formed in a disk shape having a diameter of about 2.5 inches (6.35 cm) and made of a nonmagnetic material.

The suspension assembly 20 includes a bearing portion 24 rotatably fixed to the housing 11 and a plurality of suspensions 26 extending from the bearing portion 24. The magnetic head 16 is supported at an extended end of each suspension 26. The magnetic head 16 is electrically connected to the head amplifier IC30 via a suspension trace 82 provided in the suspension assembly 20.

Next, the configuration of the magnetic head 16 will be described in detail.

As illustrated in FIG. 2, the magnetic head 16 is configured as a floating head, and a slider 15 formed in a substantially parallelepiped shape and a head unit 17 formed at an end portion on an outflow end (trailing) side of the slider 15. The slider 15 is formed of, for example, a sintered body (AlTiC) of alumina and titanium carbide, and the head unit 17 is formed of a plurality of thin films.

The slider 15 has an ABS (air bearing surface) 13 having a rectangular shape and facing a surface of the magnetic disk 12. The slider 15 is maintained in a state of floating by a predetermined amount from the surface of the magnetic disk 12 by an air flow generated between the disk surface and the ABS 13 by a rotation of the magnetic disk 12. The direction of air flow coincides with the direction of rotation of the magnetic disk 12. The slider 15 has a leading end 15a located on the inflow side of the air flow and a trailing end 15b located on the outflow side of the air flow.

The head unit 17 is a separate magnetic head in which a reproducing head 54 and a recording head 58 are formed on the trailing end 15b of the slider 15 by a thin film process. In order to control the recording/reproduction floating amount of the head unit 17, a recording heater 19a is disposed on the depth side of the recording head 58, and the reproducing heater 19b is disposed on a depth side of the reproducing head 54.

The reproducing head 54 includes a reproducing element 55 made of a magnetic film exhibiting a magnetoresistance effect, and an upper shield 56 and a lower shield 57 in which shield films are disposed so as to sandwich the magnetic film 55 on a trailing side and a leading side of the reproducing element 55. Lower ends of the reproducing element 55, the upper shield 56, and the lower shield 57 are exposed to the ABS 13 of the slider 15. The reproducing head 54 is connected to the head amplifier IC30 via an electrode, a wiring, and a wiring member 28, not illustrated, and outputs the read data to the head amplifier IC30.

The recording head 58 is provided on the trailing end 15b side of the slider 15 with respect to the reproducing head 54. The recording head 58 includes a main pole 60 made of a high magnetic permeability material that generates a recording magnetic field in a direction perpendicular to the surface of the magnetic disk 12, a return pole 62 to be a trailing shield (write shield, first shield), and a leading core 64 to be a leading shield (second shield). The main pole 60 and the return pole 62 constitute a first magnetic core forming a magnetic path, and the main pole 60 and the leading core 64 constitute a second magnetic core forming a magnetic path. The recording head 58 includes a first coil (recording coil) 70 wound around the first magnetic core, and a second coil (recording coil) 72 wound around the second magnetic core.

The main pole 60 extends substantially perpendicularly to the surface of the magnetic disk 12. The distal end portion 60a of the main pole 60 on the magnetic disk 12 side is tapered toward the disk surface, and has, for example, a trapezoidal cross section. A distal end face of the main pole 60 is exposed to the ABS 13 of the slider 15. The width of the trailing side end face 60b of the distal end portion 60a substantially corresponds to the width of the track in the magnetic disk 12.

The return pole 62 formed of a soft magnetic material is disposed on the trailing side of the main pole 60 and provided to efficiently close the magnetic path through a soft magnetic layer 102 of the magnetic disk 12 directly below the main pole 60. The return pole 62 is formed in a substantially L shape and has a first connecting portion 50 connected to the main pole 60. The first connecting portion 50 is connected to an upper portion of the main pole 60, that is, the portion of the main pole 60 away from the ABS 13 via a nonconductive body 52.

The distal end portion 62a of the return pole 62 is formed in an elongated rectangular shape, and the distal end face thereof is exposed to the ABS 13 of the slider 15. A leading side end face 62b of a distal end portion 62a extends in the width direction of the track of the magnetic disk 12 and extends substantially perpendicularly to the ABS 13. The leading side end face 62b faces the trailing side end face 60b of the main pole 60 substantially in parallel with a write gap WG.

The first coil 70 is arranged to wind around a magnetic circuit (first magnetic core) including the main pole 60 and the return pole 62. The first coil 70 is, for example, wound around the first connecting portion 50. When writing a signal to the magnetic disk 12, the first coil 70 excites the main pole 60 to flow a magnetic flux to the main pole 60 by supplying a recording current to the first coil 70.

An STO element 65 is provided in the write gap WG between the distal end portion 60a of the main pole 60 and the return pole 62, and a part of the STO element 65 is exposed to the ABS 13. The STO element 65 includes three layers, that is, a spin injection layer (Pin layer), an intermediate layer, and an oscillation layer, and when the STO element 65 is driven by the STO bias voltage, the oscillation layer oscillates due to the spin torque from the spin injection layer, and the magnetization of the recording surface of the magnetic disk 12 is assisted.

A lower end face of the STO element 65 is not limited to being flush with the ABS 13, and may be spaced upward in the height direction from the ABS 13. A lamination surface or a film surface of the spin injection layer, the intermediate layer, and the oscillation layer may be formed to be inclined with respect to the direction perpendicular to the ABS 13.

The main pole 60 and the return pole 62 are connected to connection terminals 91 and 92 of a slider pad 83 via the intra-slider wiring 80, respectively. The connection terminals 91 and 92 are connected to the head amplifier IC30 via the suspension trace 82. As a result, a current circuit is configured such that a current can be supplied in series from the head amplifier IC30 through the main pole 60, the STO element 65, and the return pole 62. The recording heater 19a and the reproducing heater 19b are connected to connection terminals 97 and 98 of the slider pad 83 via the intra-slider wiring 80 respectively. The connection terminals 97 and 98 are connected to the head amplifier IC30 via the suspension trace 82.

A leading core 64 formed of a soft magnetic material is provided on the leading side of the main pole 60 to face the main pole 60. The leading core 64 is formed substantially in an L shape, and the distal end portion 64a on the magnetic disk 12 side is formed in an elongated rectangular shape. The distal end face (lower end face) of the distal end portion 64a is exposed to the ABS 13 of the slider 15. The trailing side end face 64b of the distal end portion 64a extends in the width direction of the track of the magnetic disk 12. The trailing side end face 64b is opposed to a leading side end face of the main pole 60 with a gap. This gap is covered by a protective insulating film 76 as a nonmagnetic material.

The leading core 64 has a second connecting portion 68 joined to a back gap between the main pole 60 and the leading core 64 at a distance from the magnetic disk 12. The second connecting portion 68 is formed of, for example, a soft magnetic material, and forms a magnetic circuit together with the main pole 60 and the leading core 64. The second coil 72 of the recording head 58 is disposed to wind around a magnetic circuit (second magnetic core) including the main pole 60 and the leading core 64, and applies the magnetic field to the magnetic circuit. The second coil 72 is, for example, wound around the second connecting portion 68. A nonconductive material or a nonmagnetic material may be inserted in part of the second connecting portion 68.

The second coil 72 is wound in the opposite direction to the first coil 70. The first coil 70 and the second coil 72 are connected to terminals 95, 96 respectively, and the terminals 95, 96 are connected to the head amplifier IC30 via the suspension trace 82. The second coil 72 may be connected in series with the first coil 70. Further, the first coil 70 and the second coil 72 may separately control the supply of a current. The current supplied to the first coil 70 and the second coil 72 is controlled by the head amplifier IC30 and the main controller 40.

The reproducing head 54 and the recording head 58 are covered by a protective insulating film 76 except for a portion exposed to the ABS 13 of the slider 15. The protective insulating film 76 constitutes an outer shape of the head unit 17.

The head amplifier IC30 for driving the magnetic head 16 and the recording head 58 configured as described above includes, as illustrated in FIG. 1, a recording current supply circuit 31 configured to supply the recording current to the first coil 70 and the second coil 72 via the connection terminals 95, 96, an STO bias voltage supply circuit 32 configured to supply the STO bias voltage to the STO element 65 via the suspension trace 82 and the connection terminals 91, 92, a heater voltage supply circuit 33 configured to supply a heater voltage to the recording heater 19a and the reproducing heater 19b via the suspension trace 82 and connection terminals 97, 98, and a measurement circuit 34 configured to measure and compare an error rate of the data recorded on the magnetic disk 12. In addition, the STO bias voltage supply circuit 32 has a function of generating a test bias voltage according to an instruction, applying a bias voltage to the STO element 65, and measuring the conduction current.

During operation of the HDD 10, the main controller 40 drives the spindle motor 14 by the driver IC48 under the control of an MPU 46 and rotates the magnetic disk 12 at a predetermined speed. Further, the main controller 40 drives the VCM22 by the driver IC48 to move and position the magnetic head 16 on a desired track of the magnetic disk 12.

At the time of recording, a recording current supply circuit 31 of the head amplifier IC30 generates recording data (AC) according to the recording data and the recording pattern generated from the R/W channel 42 to the first and second coils (hereinafter, referred to as recording coils) 70, 72. Accordingly, the first and second coils 70 and 72 excite the main pole 60 to generate a recording magnetic field from the main pole 60. The STO bias voltage supply circuit 32 applies an STO bias voltage to the main pole 60 and the return pole 62 under the control of the MPU 46, thereby providing electricity in series through the suspension trace 82, the intra-slider wiring 80, the connection terminals 91 and 92, the main pole 60, The STO element 65 and the return pole 62. As illustrated in FIG. 4, a shunt resistor 81 for limiting overcurrent is connected between the connection terminals 91, 92. The heater voltage supply circuit 33 supplies a voltage corresponding to a controlled temperature from the MPU 46 to the recording heater 19a and the reproducing heater 19b. The measurement circuit 34 measures the error rate of the recording data under the control of the MPU 46.

Figure 7:
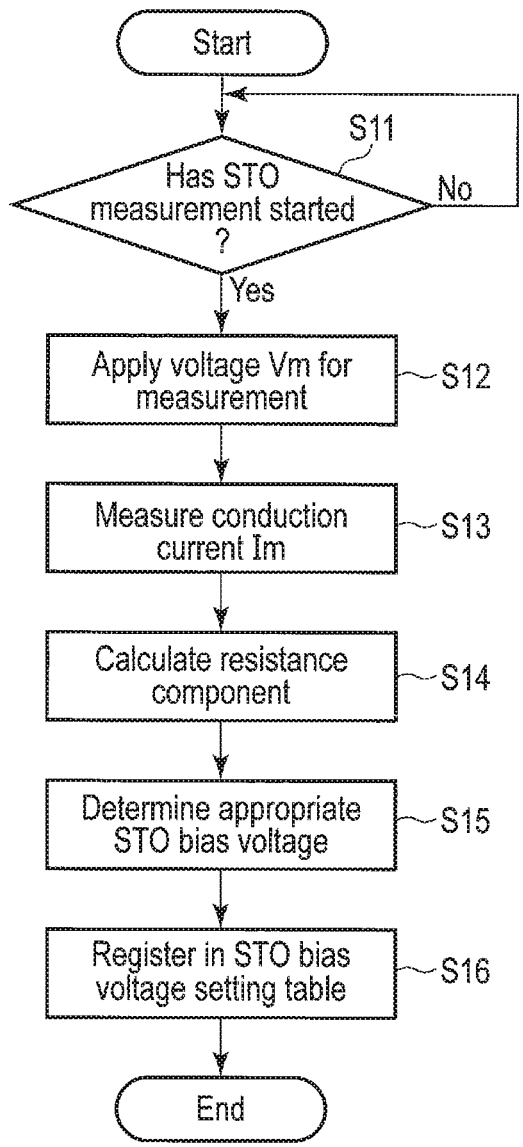
FIG. 7 is a flowchart illustrating a flow of processing for obtaining an appropriate value of the STO bias voltage in the first embodiment.
Figure 8:
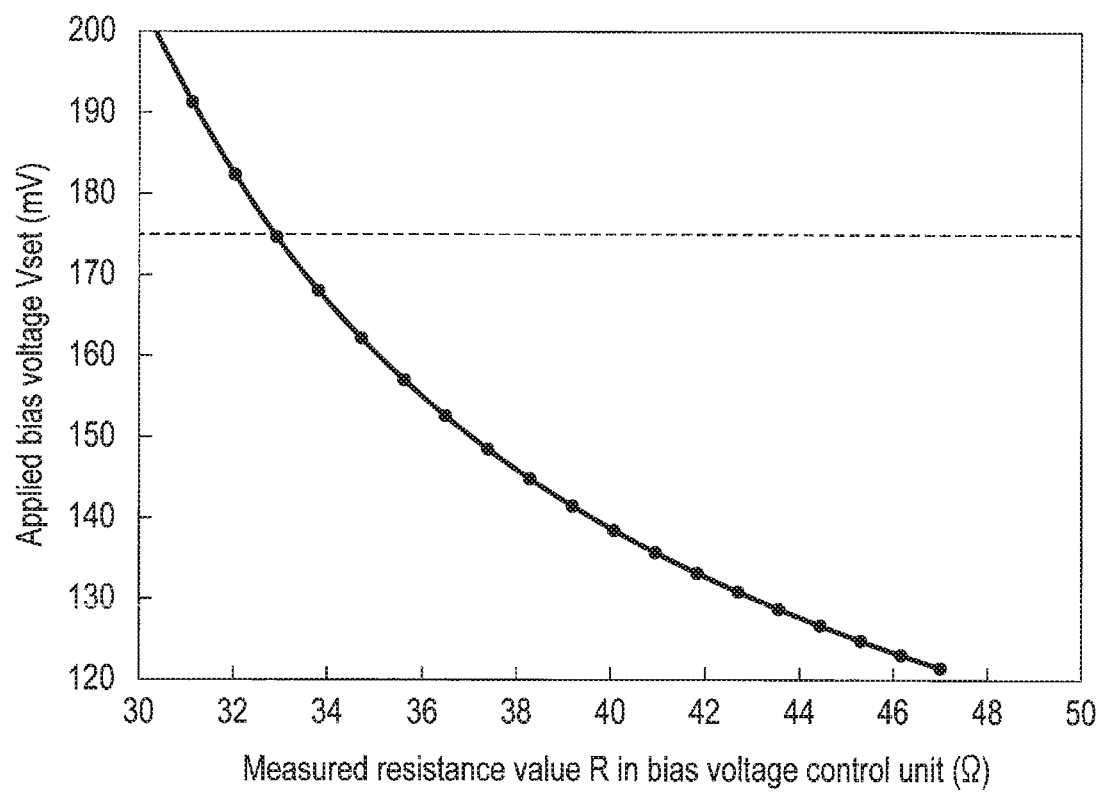
FIG. 8 is a characteristic diagram illustrating a relationship between an estimated resistance value and an applied bias voltage in an STO bias voltage control unit in the first embodiment.

In the present embodiment, FIG. 5 is a block diagram illustrating a control system configured to control the STO bias voltage at the time of data recording, FIG. 6 is a block circuit diagram illustrating an equivalent circuit in a supply path of the STO bias voltage, FIG. 7 is a flowchart illustrating a flow of processing for obtaining an appropriate value of the STO bias voltage, and FIG. 8 is a characteristic diagram illustrating the relationship between the estimated resistance value in the STO bias voltage control unit 402 and the applied bias voltage.

A control system illustrated in FIG. 5 is realized by the memory unit 300 in the MPU 46, a preamplifier unit 400, and the SoC (system on chip) 500. In the memory unit 300, an STO bias voltage setting table 301 is developed in which a relationship between a measured resistance value and the optimum STO bias voltage is tabulated. The preamplifier unit 400 includes a write driver unit 401 and an STO bias voltage control unit 402. An arithmetic processing unit 500 includes a recording data generation unit 501. The recording data generation unit 501 receives a host command for data writing and generates recording data for writing. The recording data generated by the recording data generation unit 501 is transmitted to the write driver unit 401 in the preamplifier unit 400. The write driver unit 401 calculates a recording current for recording the received recording data on the magnetic disk 12, and instructs a recording current supply circuit 31 of the head amplifier IC30 to supply the calculated recording current. As a result, data is recorded on the recording layer of the magnetic disk 12.

In the magnetic disk device of the configuration described above, the STO bias voltage control unit 402 of the preamplifier unit 400 measures an STO resistance value at the time of device manufacture, and determines an appropriate STO bias voltage according to the measured STO resistance value. As a result, in view of the influence of the resistance attached to the STO element 65, it becomes possible to apply a desired bias voltage to the STO element 65, and stabilization of the oscillation characteristic under the operating environment in the device, and a damage caused by the influence of element variations are prevented.

First, the STO bias voltage control unit 402 measures a conduction current Im when a measurement voltage Vm is applied to the STO element 65, in the bias voltage supply circuit 32, via the suspension trace 82, the intra-slider wiring 80, and the slider pad connection terminals 91, 92. In an equivalent circuit at this time, as illustrated in FIG. 6, a resistance part of the intra-slider wiring 80 is connected in series to a resistance part of the STO element 65, and a resistance part of the shunt resistor 81 is connected in parallel to both ends thereof, and a resistance part of the suspension trace 82 is connected in series to the parallel circuit.

Here, in the STO bias voltage control unit 402, in order to suppress variations in characteristics due to variations in dimension of the STO element 65, and to secure the reliability, a constant voltage is optimally supplied to the STO element itself. Therefore, the STO bias voltage control unit 402 considers variations in the size of the STO element 65 and adjusts the bias voltage to be applied according to the resistance value of the STO element itself.

The determination of the optimum STO bias voltage will be described in detail.

First, as illustrated in FIG. 7, when receiving an instruction to start STO measurement by a host command at the time of product manufacture (Step S11), the STO bias voltage control unit 402 applies measurement voltage Vm to STO element 65 (Step S12), measures the conduction current Im (step S13), calculates a total resistance component R=Vm/Im from the relationship between the measurement voltage Vm and the conduction current Im (step S14), and determines an optimum STO bias voltage applied to the STO element 65 in the magnetic head 16 according to the calculated resistance value R (step S15), and the STO bias voltage is registered in the STO bias voltage setting table 301 and used at the time of operation (step S16).

Here, in the equivalent circuit illustrated in FIG. 6, assuming that a resistance component of the STO element 65 is RSTO, a resistance component of the suspension trace 82 is Sus trace-R, a lead resistance component of the intra-slider wiring 80 is Slider Lead-R, a resistance component of the shunt resistor 81 is Shunt-R, a desired voltage value to be applied to the STO element 65 is VbSTO, an optimum STO bias voltage set in an STO bias voltage control unit 402 is Vset, a current flowing in the STO element 65 is ISTO, and a conduction current flowing in the equivalent circuit is Iset, Vset is expressed as follows.

$$Vset=(VbSTO \times (Slider\ Lead\text{-}R+RSTO)/RSTO) \times R/(R-Sus\ trace\text{-}R) \quad (1)$$

where, RSTO is $$RSTO=1/(1/(R-Sus\ trace\text{-}R)-1/Shunt\text{-}R)-Slider\ Lead\text{-}R \quad (2)$$

Since Slider Lead-R, Shunt-R and Sus trace-R can be regarded as almost constant, Vset can be expressed as a function of the measured resistance value R.

An example of adjusting Vset in accordance with the measured resistance value R based on the above equation is illustrated in FIG. 8. In view of the influence of incidental resistance such as approximately constant Slider Lead-R, Shunt-R and Sus trace-R, the smaller the dimension of the STO element 65, the higher the measured resistance value R. Therefore, in the STO bias voltage control unit 402, Vset is adjusted to be low. In contrast, when the dimension of the STO element 65 is large, the measured resistance value R becomes low, and thus Vset is adjusted to be high.

In general, considering that Shunt-R is 500 to 2000[Ω], that is, relatively higher than the other resistance, Vset at the measured resistance value R is expressed by $$Vset \approx R/(R-Slider\ Lead\text{-}R-Sus\ trace\text{-}R) \times VbSTO \quad (3).$$

In general, Slider Lead-R is 5 to 15[Ω], and Sus trace-R is 5 to 15[Ω].

Therefore, $$R/|R-10| \times VbSTO \leq Vset \leq R/|R-30| \times VbSTO \quad (4)$$

is satisfied.

Here, VbSTO should be set to a voltage Vs at which the oscillation characteristic of the STO element 65 is stabilized, and the voltage can be calculated, for example, from a voltage at which the assist gain of the overwrite (OW) characteristic when the voltage is changed reaches a desired threshold value with respect to the maximum value, for example, 90% or more of an OW gain maximum value.

In addition, assuming that R average value of the head incorporated in the device is Rave, incidental resistivity α at that time is (Slider Lead-R+Sus trace-R)/Rave, and a ratio of a specific head in the device with respect to R average value Rave is β, Vset is expressed by the following Equation (5).

$$Vset=\beta/|\beta-\alpha|\times Vs \quad (5)$$

Since Vset at Rave is established based on β=1, the average Vset ave of Vset is satisfied $$Vset\ ave=1/(1-\alpha)\times Vs \quad (6).$$

In addition, assuming that the minimum value of β in the head of the device is βmin and the maximum value is βmax, the maximum value Vset max of Vset, and the minimum value Vset min are satisfied $$Vset\ max=\beta max/|\beta max-\alpha|\times Vs \quad (7)$$

$$Vset\ min=\beta min/|\beta min-\alpha|\times Vs \quad (8).$$

Here, the average STO resistance value in the device is 15[Ω] in view of the resistivity of 40×40 [nm] dimensions. In this case, as described above, since Slider Lead-R is 5 to 15[Ω] and Sus trace-R is 5 to 15[Ω], incidental resistivity α is 0.4 to 0.67. For this reason, the maximum, minimum and average Vset voltages in the device are in the following ranges.

$$\beta max/(\beta max-0.4)\times 0.33 \le Vset\ max/Vset\ ave \le \beta max/(\beta max-0.67)\times 0.6 \quad (9)$$

$$\beta min/|\beta min-0.4|\times 0.33 \le Vset\ min/Vset\ ave \le \beta min/|\beta min-0.67|\times 0.6 \quad (10)$$

From the above, according to the magnetic disk device according to the present embodiment, the STO element 65 can be supplied with a substantially constant voltage regardless of the variations in the dimension of the STO element 65. Therefore, it is also possible to suppress the variations in write life, and thus it is possible to drive the STO element 65 stably, including the reliability.

Second Embodiment

As in the first embodiment, although it is important to control the bias voltage applied to the STO element 65 based on the resistance value R=Vm/Im at the time of application of the measurement voltage, in an actual mass-produced product, properly performing bias control in accordance with the temperature in the magnetic disk drive is necessary for securing element reliability. In this embodiment, a controlling method of the STO bias voltage according to the temperature in the disk drive will be described.

FIG. 9 is a flowchart illustrating STO bias voltage control process at the time of operation of the magnetic disk device according to the second embodiment.

First, when an operation start is instructed by the host command (step S21), the temperature in the device is measured (step S22). It is determined whether or not there is a temperature change (step S23). If there is a temperature change, the bias voltage is increased when the temperature rises, and the bias voltage is decreased when the temperature drops (step S24). If there is no temperature change, whether or not the operation is stopped is determined, and the bias voltage is adjusted in accordance with the temperature change until the operation stop is instructed (step S25).

Here, in the equivalent circuit illustrated in FIG. 6, assuming that a resistance component of the STO element 65 is RSTO, a resistance component of the suspension trace 82 is Sus trace-R, a lead resistance component of the intra-slider wiring 80 is Slider Lead-R, a resistance component of the shunt resistor 81 is Shunt-R, a desired voltage value to be applied to the STO element 65 is VbSTO, an optimum STO bias voltage set in an STO bias voltage control unit 402 is Vset, a current flowing in the STO element 65 is ISTO, a conduction current flowing in the equivalent circuit is Iset, a normal temperature is Tr, and a drive internal temperature is Tx, when a resistance value R is measured in a case of the normal temperature Tr and the drive internal temperature Tx, the following equations are satisfied.

$$Rin@Tr=R-Sus\ trace-R@Tr \quad (11)$$

$$RSTO@Tr=1/(1/Rin@Tr-1/Shunt-R)-Slider\ Lead-R@Tr \quad (12)$$

$$RSTO@Tx=RSTO@Tr+RSTO@Tr\times(Tx-Tr)\times RSTO\ temperature\ coefficient \quad (13)$$

$$Slider\ Lead-R@Tx=Slider\ Lead-R@Tr+Slider\ Lead-R@Tr\times(Tx-Tr)\times Slider\ Lead-R\ temperature\ coefficient \quad (14)$$

$$Sus\ trace-R@Tx=Sus\ trace-R@Tr+Sus\ trace-R@Tr\times(Tx-Tr)\times Sus\ trace-R\ temperature\ coefficient \quad (15)$$

$$Shunt-R@Tx=Shunt-R@Tr+Shunt-R@Tr\times(Tx-Tr)\times Shunt-R\ temperature\ coefficient \quad (16)$$

Here, the suffixes @Tx, @Tr of each of the resistance value, current value, and voltage value mean values at the drive internal temperature Tx or at the normal temperature.

The temperature rise ΔT when driving the STO element 65 by actually applying the voltage VbSTO to the STO element 65 is expressed by the following equation. Here, the suffixes of the resistance value, the current value, and the voltage value are on when the STO element 65 is in the ON state.

$$\Delta T=c2\times VbSTO^2+c1\times VbSTO+\Delta TIAD+\Delta THeater \quad (17),$$

where, c1 and c2 are temperature rise coefficients when the voltage VbSTO is applied, ΔTIAD is the temperature rise degree by the write current application, and ΔTHeater is the temperature rise degree by the heater driving.

The STO resistance value after the temperature rise is expressed by the following equation.

$$RSTO@Tx,on=RSTO@Tr+RSTO@Tr\times(Tx+\Delta T-Tr)\times RSTO\ temperature\ coefficient\ of\ resistance \quad (18)$$

The current value flowing through the STO element 65 is expressed by the following equation.

$$ISTO@Tx,on=VbSTO/RSTO@Tx,on \quad (19)$$

The current value during bias control is expressed as follows.

$$Iset@Tx,on=ISTO@Tx,on+ISTO@Tx,on\times(Slider\ Lead-R@Tx+RSTO@Tx,on)/Shunt-R@Tx \quad (20)$$

Therefore, the bias voltage value Vset can be expressed as follows.

$$Vset@Tx=Iset@Tx,on\times(1/(1/Shunt-R@Tx+1/(RSTO@Tx,on+Slider\ Lead-R@Tx)+Sus\ trace-R@Tx) \quad (21)$$

Figure 10:
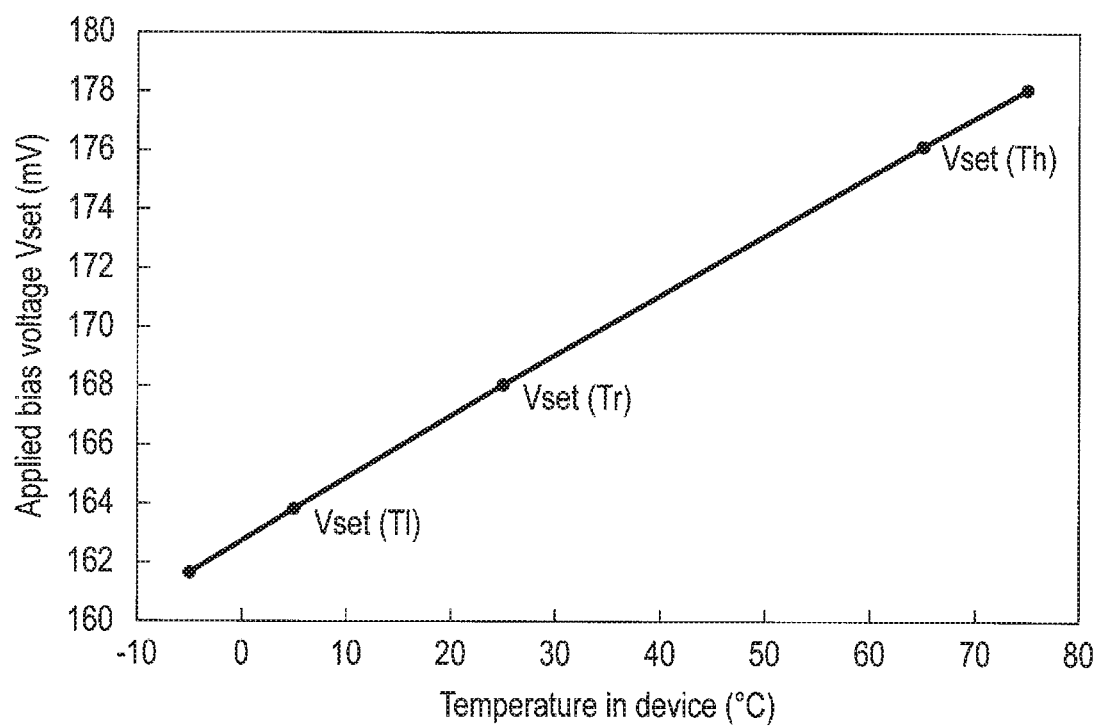
FIG. 10 is a characteristic diagram illustrating the relationship between the internal temperature of the device and an optimum bias voltage applied to the STO in the second embodiment.

Here, in general, considering that the Slider Lead-R resistance temperature coefficient, the Sus trace-R temperature coefficient, and the Shunt-R temperature coefficient are larger than the RSTO resistance temperature coefficient, the STO with respect to the temperature in the magnetic disk device will be the STO bias voltage value Vset @Tx as illustrated in FIG. 10. That is, in view of the fact that the temperature coefficients of Lead-R, Sus trace-R and Shunt-R, each of which is incidental resistance, are large, as illustrated in the drawing, the bias voltage applied is set to be lower as the temperature becomes lower, conversely, the bias voltage to be applied is set to be higher as the temperature rises. As a result, the STO element 65 can be supplied with a substantially constant voltage regardless of the temperature change in the device, and the STO element 65 can be stably driven with reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk having a recording layer;
   a recording head that applies a perpendicular recording magnetic field to the recording layer; and
   a controller that controls the recording head, wherein the recording head includes:
      a main pole that generates the perpendicular recording magnetic field at a distal end portion;
      a return pole having a distal end portion facing the distal end portion of the main pole via a write gap;
      a coil that excites a magnetic flux in a magnetic circuit formed by the main pole and the return pole;
      a high frequency assist element that is disposed in the write gap, oscillates a high frequency wave by an application of a bias voltage, and assists magnetization of the magnetic disk using the high frequency wave; and
      a bias voltage supply source that supplies the bias voltage to be applied to the high frequency assist element through the main pole and the return pole,
   the controller applies a bias voltage for measurement to the high frequency assist element according to a setting instruction of the bias voltage to measure a conduction current, calculates a resistance value in a supply path of the bias voltage from a relationship between the measured current and the bias voltage for measurement, and changes the bias voltage applied at the time of data recording based on the calculated resistance value.

2. The magnetic disk device of claim 1, wherein the controller changes the bias voltage applied at the time of data recording to a lower value as the resistance value is higher.

3. The magnetic disk device of claim 2, wherein assuming that the resistance value is R and a reference value of the bias voltage at which an oscillation characteristic of the high frequency assist element is stabilized is Vs,
   the controller changes a bias voltage Vset applied at the time of data recording within a range of $R/|R-10|\times Vs$ or more, $R/|R-30|\times Vs$ or less.

4. The magnetic disk device of claim 2, wherein assuming that an average value of the resistance value R of the recording head is Rave, an incidental resistivity at that time is α, and a maximum value of a ratio β to the average value Rave of the resistance value R of the recording head is βmax,
   the controller changes a ratio of a maximum value to an average value of a bias voltage Vset applied at the time of data recording to $\beta max/(\beta max-0.4)\times 0.33$ or more, $\beta max/(\beta max-0.67)\times 0.6$ or less.

5. The magnetic disk device of claim 2, wherein assuming that an average value of the resistance value R of the recording head is Rave, an incidental resistivity at that time is α, and a minimum value of a ratio β to the average value Rave of the resistance value R of the recording head is βmin,
   the controller changes a ratio of a minimum value to an average value of a bias voltage Vset applied at the time of data recording to $\beta min/|\beta min-0.4|\times 0.33$ or more, $\beta min/|\beta min-0.67|\times 0.6$ or less.

6. The magnetic disk device of claim 1, wherein the recording head further comprises a temperature sensor that measures an internal temperature; and
   the controller changes the bias voltage applied at the time of data recording to a higher value as the temperature measured by the temperature sensor is higher.

7. The magnetic disk device of claim 6, wherein assuming that the resistance value observed under an environment of a measured temperature Th is R(Th), and the resistance value observed under an environment of a reference temperature Tr is R(Tr) under an environment where the measured temperature Th of the temperature sensor is equal to or higher than the reference temperature Tr, the controller changes the bias voltage applied at the time of data recording so that a ratio Vset(Th)/Vset(Tr) of a bias voltage Vset(Th) applied at the time of data recording under the environment of the measured temperature Th to a bias voltage Vset(Tr) applied when data is recorded under the environment of the reference temperature Tr becomes 1 or more and R(Th)/R(Tr) or less.

8. The magnetic disk device of claim 6, wherein in an environment where a measured temperature Tl of the temperature sensor is equal to or lower than a reference temperature Tr, the controller changes the bias voltage applied at the time of data recording so that a ratio Vset(Tl)/Vset(Tr) of a bias voltage Vset(Tl) applied at the time of data recording under an environment of the measured temperature Tl to a bias voltage Vset(Tr) applied under an environment of the reference temperature Tr becomes R(Tl)/R(Tr) or more and 1 or less, assuming that the resistance value observed under the environment of the temperature Tl is R(Tl), and the resistance value observed under the environment of the reference temperature Tr is R(Tr).

9. A recording head controlling method for a magnetic disk device, when
   a recording head that applies a perpendicular recording magnetic field to a recording layer of a magnetic disk comprises:
      a main pole that generates the perpendicular recording magnetic field at a distal end portion;

a return pole having a distal end portion facing the distal end portion of the main pole via a write gap;

a coil that excites a magnetic flux in a magnetic circuit formed by the main pole and the return pole;

a high frequency assist element that is disposed in the write gap, oscillates a high frequency wave by an application of a bias voltage, and assists magnetization of the magnetic disk using the high frequency wave; and a bias voltage supply source that supplies the bias voltage to be applied to the high frequency assist element through the main pole and the return pole, the method comprising:

applying a bias voltage for measurement to the high frequency assist element according to a setting instruction of the bias voltage to measure a conduction current, calculating a resistance value in a supply path of the bias voltage from a relationship between the measured current and the bias voltage for measurement, and changing the bias voltage applied at the time of data recording based on the calculated resistance value.

10. The recording head controlling method for a magnetic disk device of claim 9, wherein the bias voltage applied at the time of data recording is changed to a lower value as the resistance value is higher.

11. The recording head controlling method for a magnetic disk device of claim 10, wherein assuming that the resistance value is R and a reference value of the bias voltage at which an oscillation characteristic of the high frequency assist element is stabilized is Vs, a bias voltage Vset applied at the time of data recording is changed to a range of $R/|R-10|\times Vs$ or more, $R/|R-30|\times Vs$ or less.

12. The recording head controlling method for magnetic disk device of claim 10, wherein assuming that an average value of the resistance value R of the recording head is Rave and an incidental resistivity at that time is $\alpha$, and a maximum value of a ratio $\beta$ to the average value Rave of the resistance value R of the recording head is $\beta$max, a ratio of a maximum value to an average value of a bias voltage Vset applied at the time of data recording is changed to $\beta max/(\beta max-0.4)\times 0.33$ or more, $\beta max/(\beta max-0.67)\times 0.6$ or less.

13. The recording head controlling method for magnetic disk device of claim 10, wherein assuming that an average value of the resistance value R of the recording head is Rave, an incidental resistivity at that time is $\alpha$, and a minimum value of a ratio $\beta$ to the average value Rave of the resistance value R of the recording head is $\beta$min, a ratio of a minimum value to an average value of a bias voltage Vset applied at the time of data recording is changed to $\beta min/|\beta min-0.4|\times 0.33$ or more, $\beta min/|\beta min-0.67|\times 0.6$ or less.

14. The recording head controlling method for magnetic disk device of claim 9, wherein when the recording head further includes a temperature sensor that measures an internal temperature, the bias voltage applied at the time of data recording is changed to a higher value as the temperature measured by the temperature sensor is higher.

15. The recording head controlling method for a magnetic disk device of claim 14, wherein assuming that the resistance value observed under an environment of a measured temperature Th is R(Th), and the resistance value observed under an environment of a reference temperature Tr is R(Tr) under an environment where the measured temperature Th of the temperature sensor is equal to or higher than the reference temperature Tr, the bias voltage applied at the time of data recording is changed so that a ratio Vset(Th)/Vset(Tr) of a bias voltage Vset(Th) applied at the time of data recording under the environment of the measured temperature Th to a bias voltage Vset(Tr) applied when data is recorded under the environment of the reference temperature Tr becomes 1 or more and R(Th)/R(Tr) or less.

16. The recording head controlling method for a magnetic disk device of claim 14, wherein in an environment where a measured temperature Tl of the temperature sensor is equal to or lower than a reference temperature Tr, the bias voltage applied at the time of data recording is changed so that a ratio Vset(Tl)/Vset(Tr) of a bias voltage Vset(Tl) applied at the time of data recording under an environment of the measured temperature Tl to a bias voltage Vset(Tr) applied under an environment of the reference temperature Tr becomes R(Tl)/R(Tr) or more and 1 or less, assuming that the resistance value observed under the environment of the temperature Tl is R(Tl), and the resistance value observed under the environment of the reference temperature Tr is R(Tr).

* * * * *